Figure 1:
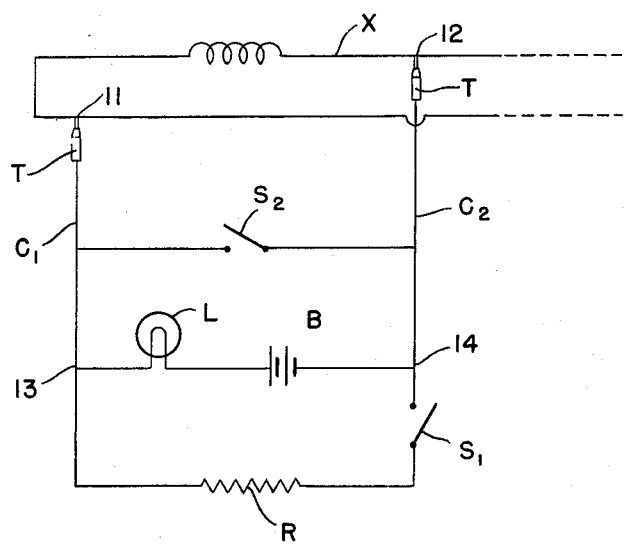

Dec. 2, 1952 P. L. ZIMMERMAN 2,620,379
CIRCUIT CONTINUITY TESTER
Filed March 15, 1951

INVENTOR.
PHILIP L. ZIMMERMAN
BY

ATTORNEY

Patented Dec. 2, 1952

2,620,379

UNITED STATES PATENT OFFICE 2,620,379

CIRCUIT CONTINUITY TESTER

Philip L. Zimmerman, New York, N. Y.

Application March 15, 1951, Serial No. 215,772

5 Claims. (Cl. 175—183)

This invention relates to a circuit continuity tester and, more particularly, to an improvement in such a device which enables it to be adapted for testing the continuity of circuits having a wide range of values of resistance.

In the prior art circuit continuity testers are well-known and generally comprise a light bulb and battery connected in series with a pair of contact leads adapted to be placed in contact with the circuit to be tested. If the latter is continuous, that is, if there are no breaks in the circuit being tested, current will then flow through the complete circuit formed by the battery bulb, contact leads and circuit being tested. When the current thus flows, the light bulb will be illuminated so as to indicate that the circuit being tested is continuous, at least as to that portion of the circuit between the points thereof engaged by the contact leads.

This conventional arrangement for testing the continuity of circuits is embued with a disadvantageous limitation due to the characteristic of the light bulb. Since it requires a certain minimum value of current flowing through the light bulb to illuminate the latter to even the slightest visible degree, it would be obvious that when the resistance of the circuit being tested exceeds a certain value insufficient current will flow through the light bulb to illuminate same perceptibly notwithstanding the fact that the circuit being tested is continuous. In other words, the conventional circuit continuity tester of the prior art can be employed to test only circuits having a limited value of maximum resistance, beyond which value the tester is deceptive and fails to indicate continuity even though the high resistance circuit being tested is in fact continuous.

It is therefore a primary object of the present invention to provide an improved form of circuit continuity tester whereby circuits having resistance values beyond the normal range may be effectively tested. This improvement resides in the addition of a resistance connectable by a switch in series relation with respect to the battery and light bulb. That is, when the switch is closed current will flow from the battery, through the light bulb, and then back to the battery by way of the series resistance. The value of this series resistance is selected so as to produce a dull glow in the light bulb before the contact leads are applied to the circuit. The characteristic of the light bulb is such that a very slight increment in current will cause the dull glow to be perceptibly brightened. It will thus be seen that when the contact leads are applied to a circuit having a relatively high resistance, the slight increment in current thus produced through the light bulb will cause a visible brightening of the latter so as to indicate that the circuit is continuous.

The testing device of the present invention may be employed to test the continuity of such widely different types of electrical circuits as lengthy television transmission lines, filaments of electronic tubes, and household appliances such as irons and toasters.

A further object of the present invention is to provide a conductor and switch means connectable across the battery and light bulb so as to provide a short-circuit therethrough, thereby converting the testing device to a flash-light if desired.

Figure 2:
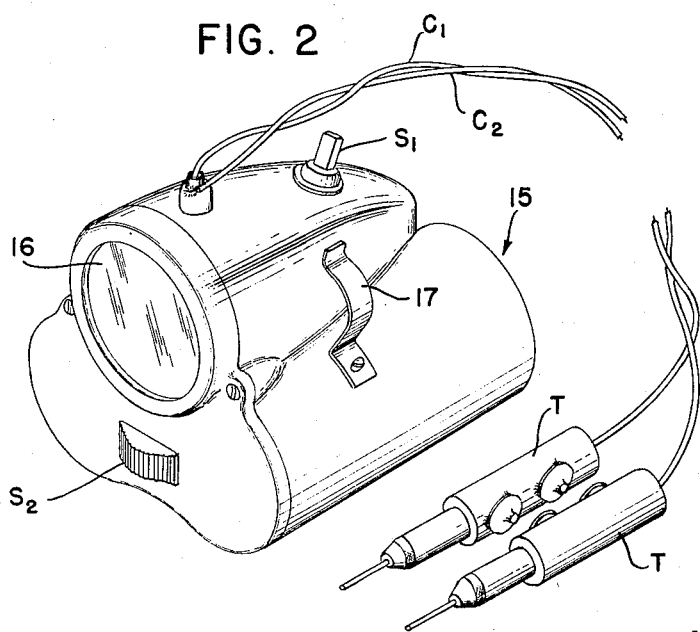

Other advantages of the present invention are inherent in the structure as claimed and as disclosed in the specification and drawing wherein:

Figure 1 is a schematic circuit diagram showing the various electrical components of the tester device of the present invention and a circuit being tested by same; and Figure 2 is a perspective view of the device showing a preferred physical arrangement of the various components.

Referring first to Figure 1, the conventional aspects of the device will first be described. A light bulb L, which may be of the usual flashlight bulb type, is connected at one terminal to a first terminal of a battery B. A pair of contact leads $C_1$, $C_2$ are provided, each having at its outer end the usual contact terminal T adapted to be placed in electrical contact with a pair of spaced points of the circuit to be tested. The latter is indicated generally by the reference letter X, the contact terminals T contacting the circuit X at the points 11, 12 respectively. The contact lead $C_1$ is connected to the other terminal or end of the light bulb L and the contact lead $C_2$ is connected to the second terminal of the battery B.

It will thus be seen that if the circuit X is continuous between the points 11, 12, current will flow from the battery B through the light bulb L, through the contact lead $C_1$, through the portion of the circuit X between the points 11, 12, through the contact lead $C_2$ and then back to the battery B. If this current is of sufficient value the light bulb L will be illuminated, thereby indicating that the circuit X is continuous between the points 11, 12. However, even if the circuit X is continuous, if its resistance is beyond a certain value the current flowing through the light bulb L will be insufficient to cause the latter to be illuminated to any perceptible extent since it requires a minimum value of current to impart to the light bulb L even a dull glow. It will, therefore, be obvious that only circuits having a limited range of resistance values may be tested by the conventional arrangement heretofore described.

The primary novel feature of my invention resides in the improvement now to be described. A series resistance R is connected at one end to said other end of the light bulb L, that is, the terminal of the light bulb L to which the contact lead $C_1$ is connected, as at 13. The opposite end of the resistance R is connected to a switch $S_1$ which, when closed, connects said opposite end of the resistance R to the second terminal of the battery B as at 14. When the resistance of the circuit X is so large that the light bulb L would not be visibly illuminated, the device is adapted for this higher range of circuit resistance by closing the switch $S_1$, thereby placing the series resistance R in series with the light bulb L and battery B. This results in a closed circuit from the battery B through light bulb L, the resistance R, the switch $S_1$, and back to the battery B. The current flowing through this circuit will impart a dull glow to the light bulb L, when the contact terminals T are applied to the circuit X. If the circuit X is continuous between the points 11, 12, a slight increment in curent will flow through the light bulb L, thereby causing the dull glow of the latter to be perceptibly brightened so as to indicate continuity in the circuit X.

For purposes of illustration of one form which the invention may take in practice, the following specific values may be assigned to the various electrical elements of the device. The light bulb L may be of the type requiring a minimum current of 130 milliamperes before any perceptible glow commences and being fully illuminated at 230 milliamperes. The resistance R may be approximately 8 ohms. The battery B is preferably of the two cell type having three volts.

With these specific values, a current of approximately 230 milliamperes will flow through the light bulb L when the resistance between points 11, 12 of the line X is zero. When the resistance of circuit X is approximately 10 ohms, about 130 milliamperes will flow through the light bulb L, assuming that the switch $S_1$ is open. Therefore it will be seen that when the resistance of the circuit X being tested is above 10 ohms, the current flowing through the light bulb L will be below the minimum value of 130 milliamperes necessary to commence illumination. However, when the switch $S_1$ is closed a curent of 175 milliamperes will initially flow through the circuit comprising resistance R, battery B and light bulb L. If the contact leads $C_1$, $C_2$ are then applied to the circuit X the resistance of the latter may be as high as 70 or 80 ohms. This will result in a slight increment of approximately 5 to 15 milliamperes, depending upon the internal resistance of the battery, being added to the current of 175 milliamperes already flowing through the bulb L. The light bulb characteristic is such that this value of 5 to 15 milliamperes would in itself produce not the slightest glow in the light bulb L. However, if the bulb L has already been illuminated by approximately 175 milliamperes, an increment of merely 5 to 15 milliamperes causes a perceptible brightening of the bulb L.

A switch $S_2$ may be connected by a suitable conductor across the terminals 13, 14 and battery B. It will thus be seen that when the switch $S_2$ is closed a circuit is formed through the bulb L and battery B, causing the bulb L to be illuminated at maximum intensity. Therefore, closing the switch $S_2$ serves to convert the testing device to a flash-light.

In Figure 2 there is shown a prefered physical arrangement of the various components of the device for purposes of illustration merely, it being understood that the invention in no way resides in this physical arrangement. The reference numeral 15 indicates generally a case having a conventional light bulb housing 16 within which is mounted the light bulb L. The switch $S_1$ is shown in the form of a push button mounted on top of the housing 15 and the switch $S_2$ is mounted at the front of the casing 15 and is of the conventional flash-light type. The contact leads $C_1$, $C_2$ extend from the top front portion of the case 15 and are shown with conventional contact terminals T at their outer ends. Suitable brackets, such as at 17, may be provided on the case 15 for holding the terminals T when the latter are not in use.

It is to be understood that the device as shown in the drawing and described hereinabove is merely illustrative of one of the many forms which the invention may take in practice without departing from the scope of the appended claims. For instance, the light bulb L may be replaced by any other indicator means adapted to conduct electrical current and to indicate the passage of such current therethrough. Furthermore, it will be obvious that other sources of D. C. battery electrical voltage may be substituted for the battery B shown. Also, it will be evident to those skilled in the art that instead of a single resistance R, a plurality of such resistances may be employed in various types of selectable series arrangements. Of course, the resistance R may be in the form of a variable rheostat. Other modifications of the disclosed embodiment will be obvious and are not described herein for purposes of brevity.

I claim:

1. A device for testing the continuity of electrical circuits, said device comprising a flashlight bulb, a flashlight battery having one end connected with one end of the light bulb, a pair of contact leads having means for making electrical contact with an electrical circuit, one of said contact leads being connected to the other end of the light bulb and the other of said contact leads being connected to the other end of the battery, whereby said light bulb, battery and contact leads are connected in series, a series resistance of about 8 ohms connected to said other end of the light bulb and to said other end of the battery, and a switch for disconnecting said series resistance from one of said other ends.

2. In a circuit continuity testing device having a light bulb, a D. C. battery having one end connected with one end of the light bulb, a pair of contact leads having means for making electrical contact with an electrical circuit under test, one of said contact leads being connected to the other end of the light bulb and the other of said contact leads being connected to the other end of the battery, the improvement comprising a series resistance connected to said other end of the light bulb and to said other end of the battery, and switch means for disconnecting said series resistance from one of said other ends.

3. In a circuit continuity testing device having a light bulb adapted to conduct an electrical current and to indicate the passage of current therethrough, a D. C. source of voltage connected at one end to one end of said light bulb, a first contact lead connected to said source of voltage and a second contact lead connected to said indicator means, said light bulb, source of voltage, and contact leads being connected in series, the improvement comprising an electrical resistance of about 8 ohms connected in series relation to said voltage source and light bulb, whereby current from the voltage source may flow through the light bulb and then through both the circuit being tested and said electrical resistance.

4. A device for testing the continuity of electrical circuits comprising a light bulb adapted to conduct an electrical current and to indicate the passage of current therethrough, a portable D. C. battery having one end connected to one end of said light bulb, a first contact lead connected to the other end of said battery, and a second contact lead connected to the other end of said light bulb, an electrical resistance of about 8 ohms and a selectable switch for connecting or disconnecting said resistance in series relation to said light bulb and said battery, whereby said light bulb, battery, and contact leads are connected in series.

5. The apparatus of claim 3 wherein the test leads are connected across the series resistance of about 8 ohms.

PHILIP L. ZIMMERMAN.

REFERENCES CITED

The following references are of record in the file of this patent:

UNITED STATES PATENTS

| Number | Name | Date |
| --- | --- | --- |
| 2,256,129 | Tainer | Sept. 16, 1941 |
| 2,540,402 | Mosier | Feb. 6, 1951 |
| 2,540,471 | Borsody | Feb. 6, 1951 |
| 2,550,234 | Duncan | Apr. 24, 1951 |